(12) United States Patent
Yang et al.

(10) Patent No.: US 9,991,647 B1
(45) Date of Patent: Jun. 5, 2018

(54) PLUG CONNECTOR HAVING A CIRCUIT BOARD WITH AN ENCRYPTION CHIP CONNECTED TO A TERMINAL

(71) Applicant: Cheng Uei Precision Industry Co., Ltd., New Taipei (TW)

(72) Inventors: Yu-Lin Yang, Dong-Guan (CN); Feng-Tian Liu, Dong-Guan (CN)

(73) Assignee: CHENG UEI PRECISION INDUSTRY CO., LTD., New Taipei (TW)

( * ) Notice: Subject to any disclaimer, the term of this patent is extended or adjusted under 35 U.S.C. 154(b) by 0 days. days.

(21) Appl. No.: 15/598,247

(22) Filed: May 17, 2017

(51) Int. Cl.
| | |
|---|---|
| H01R 13/66 | (2006.01) |
| H01R 24/60 | (2011.01) |
| H01R 13/6581 | (2011.01) |
| G06F 21/72 | (2013.01) |
| H01R 13/6466 | (2011.01) |
| H01R 107/00 | (2006.01) |

(52) U.S. Cl.
CPC ........... *H01R 13/665* (2013.01); *G06F 21/72* (2013.01); *H01R 13/6466* (2013.01); *H01R 13/6581* (2013.01); *H01R 24/60* (2013.01); *H01R 2107/00* (2013.01)

(58) Field of Classification Search
CPC ............ H01R 13/6466; H01R 13/6581; H01R 13/665; H01R 13/6658; H01R 13/66; H01R 24/60

USPC ......................................... 439/620.24, 620.25
See application file for complete search history.

(56) References Cited

U.S. PATENT DOCUMENTS

| 7,708,566 B2 * | 5/2010 | Sabo ................. | H01R 13/6485 439/181 |
|---|---|---|---|
| 8,439,711 B2 * | 5/2013 | Wang .................... | H01R 24/64 439/676 |
| 2006/0286867 A1 * | 12/2006 | Legrow ............... | H01R 12/716 439/620.24 |
| 2012/0171898 A1 * | 7/2012 | Wang ................. | H01R 13/6658 439/607.01 |

* cited by examiner

*Primary Examiner* — Chandrika Prasad
(74) *Attorney, Agent, or Firm* — Cheng-Ju Chiang

(57) ABSTRACT

A plug connector includes a dielectric body having a docking surface, a circuit board mounted to a rear of the dielectric body, a plurality of first terminals and a second terminal. The plurality of the first terminals are fastened to the dielectric body. Top surfaces of front ends of the plurality of the first terminals are exposed to the docking surface of the dielectric body. Rear ends of the plurality of the first terminals project beyond a rear surface of the dielectric body and are soldered to the circuit board. The second terminal is fastened to the dielectric body. A front end of the second terminal elastically projects beyond the docking surface of the dielectric body, and a rear end of the second terminal projects beyond the rear surface of the dielectric body and is soldered to the circuit board.

19 Claims, 7 Drawing Sheets

PLUG CONNECTOR HAVING A CIRCUIT BOARD WITH AN ENCRYPTION CHIP CONNECTED TO A TERMINAL

BACKGROUND OF THE INVENTION

1. Field of the Invention

The present invention generally relates to a connector, and more particularly to a plug connector having an On-The-Go function.

2. The Related Art

Usually, a conventional plug connector generally includes an insulating housing, two signal terminals and two power terminals. The conventional plug connector is a universal serial bus connector. A lower portion of a front surface of the insulating housing protrudes frontward to form a tongue board. The two signal terminals and the two power terminals are fastened to the insulating housing and arranged transversely. Top surfaces of front ends of the two signal terminals and the two power terminals are exposed to a top surface of the tongue board. However, when the conventional plug connector is connected with an electronic equipment, especially a mobile device, the conventional plug connector is without an On-The-Go (OTG) function, so the conventional plug connector can just realize data transmissions by virtue of connecting with a computer host. The mobile device is a handheld computer, a mobile phone, etc. Moreover, an encryption chip is incapable of being read by virtue of the conventional plug connector.

Thus, it is essential to provide an innovative plug connector having an On-The-Go (OTG) function, the encryption chip is read by virtue of the innovative plug connector for satisfying a variety of needs of users.

SUMMARY OF THE INVENTION

An object of the present invention is to provide a plug connector having an On-The-Go function. The plug connector includes a dielectric body having a docking surface, a circuit board mounted to a rear of the dielectric body, a plurality of first terminals and a second terminal. The plurality of the first terminals are fastened to the dielectric body and arranged transversely. Top surfaces of front ends of the plurality of the first terminals are exposed to the docking surface of the dielectric body. Rear ends of the plurality of the first terminals project beyond a rear surface of the dielectric body and are soldered to the circuit board. The second terminal is fastened to the dielectric body. The second terminal is located behind the front ends of the plurality of the first terminals. A front end of the second terminal elastically projects beyond the docking surface of the dielectric body, and a rear end of the second terminal projects beyond the rear surface of the dielectric body and is soldered to the circuit board.

As described above, the second terminal is fastened to the dielectric body, the front end of the second terminal elastically projects beyond the docking surface of the dielectric body, and the rear end of the second terminal projects beyond the rear surface of the dielectric body and is soldered to the circuit board, an encryption chip is read by virtue of the second terminal of the plug connector for satisfying a variety of needs of users, so that the plug connector has the On-The-Go (OTG) function. Furthermore, the plurality of the first terminals and the second terminal are integrally formed, the plurality of the first terminals and the second terminal are integrally molded to the dielectric body. As a result, the plug connector has simple production processes, a higher assembling efficiency and a lower production cost.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
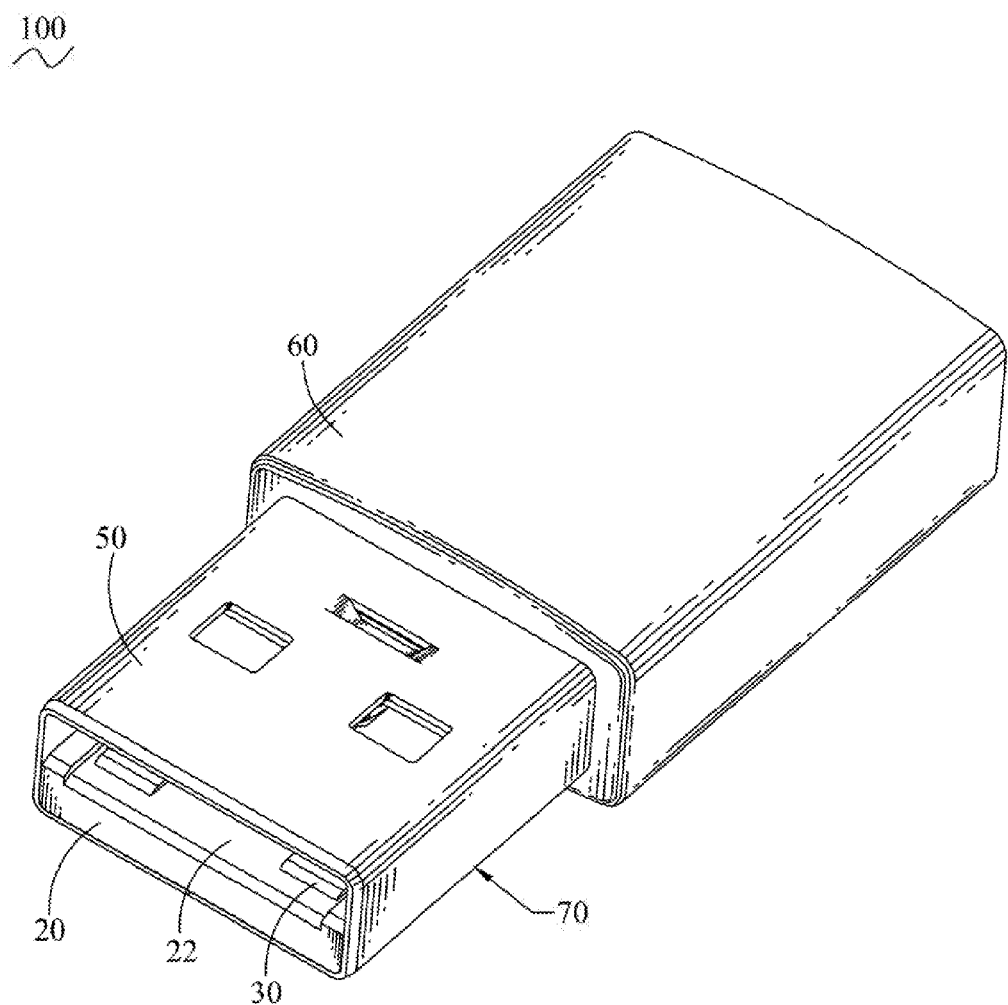
FIG. 1 is a perspective view of a plug connector in accordance with a preferred embodiment of the present invention.
Figure 2:
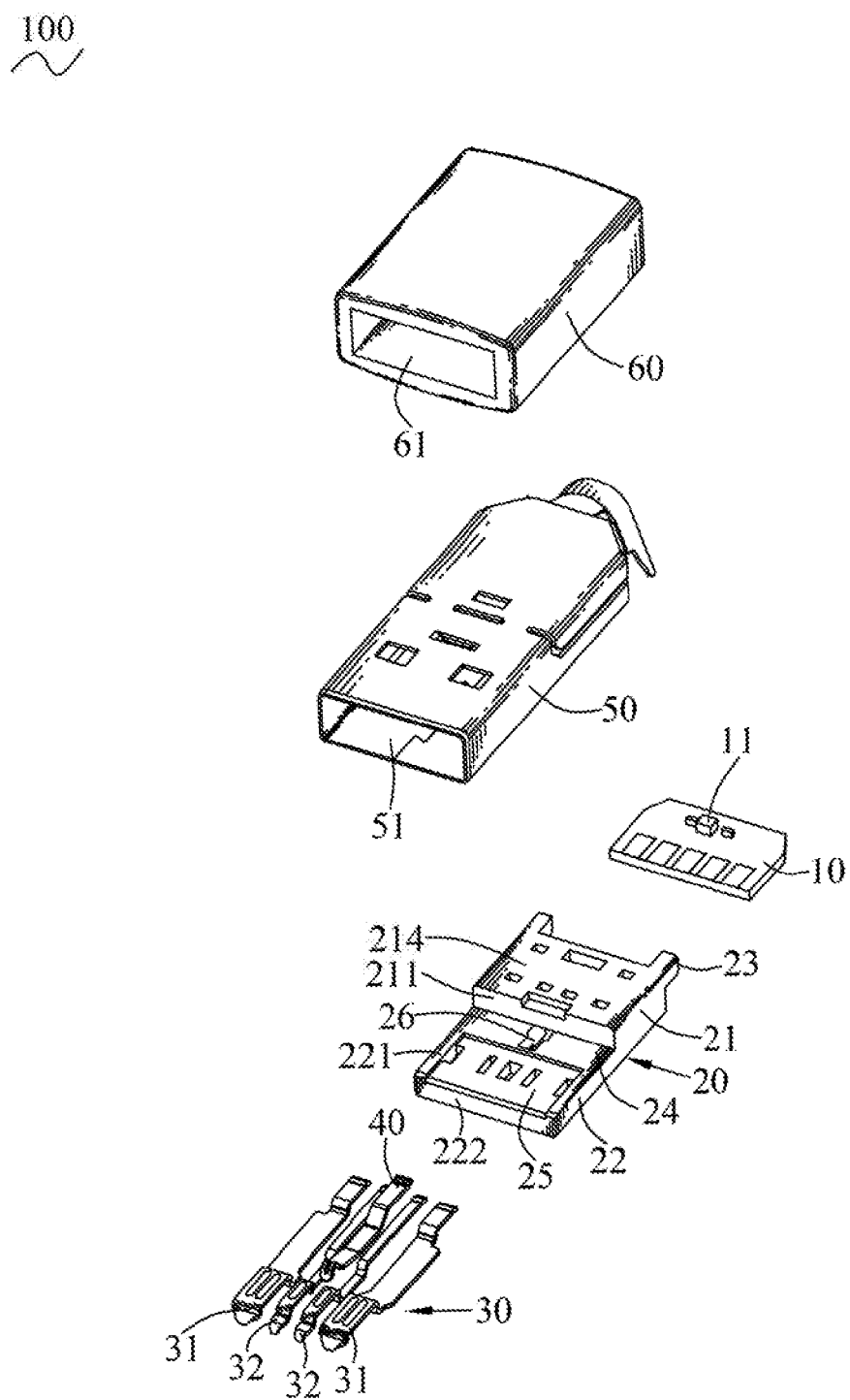
FIG. 2 is an exploded view of the plug connector of FIG. 1.

With reference to FIG. 1 and FIG. 2, a plug connector 100 in accordance with a preferred embodiment of the present invention is shown. The plug connector 100 includes a circuit board 10, a dielectric body 20, a plurality of first terminals 30, a second terminal 40, a shielding shell 50 and an insulating housing 60. The plug connector 100 has an On-The-Go (OTG) function.

Figure 3:
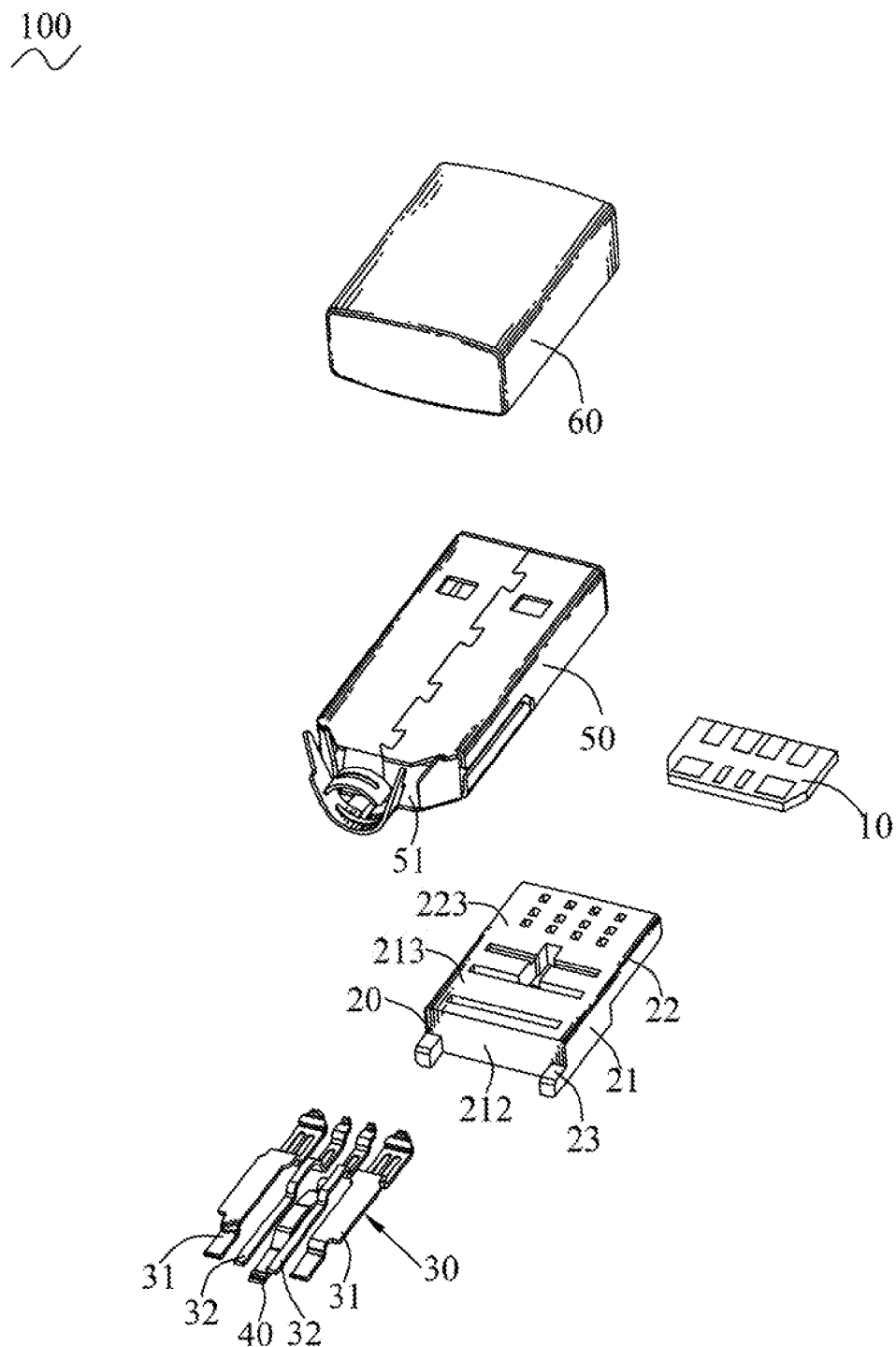
FIG. 3 is another exploded view of the plug connector of FIG. 1.
Figure 7:
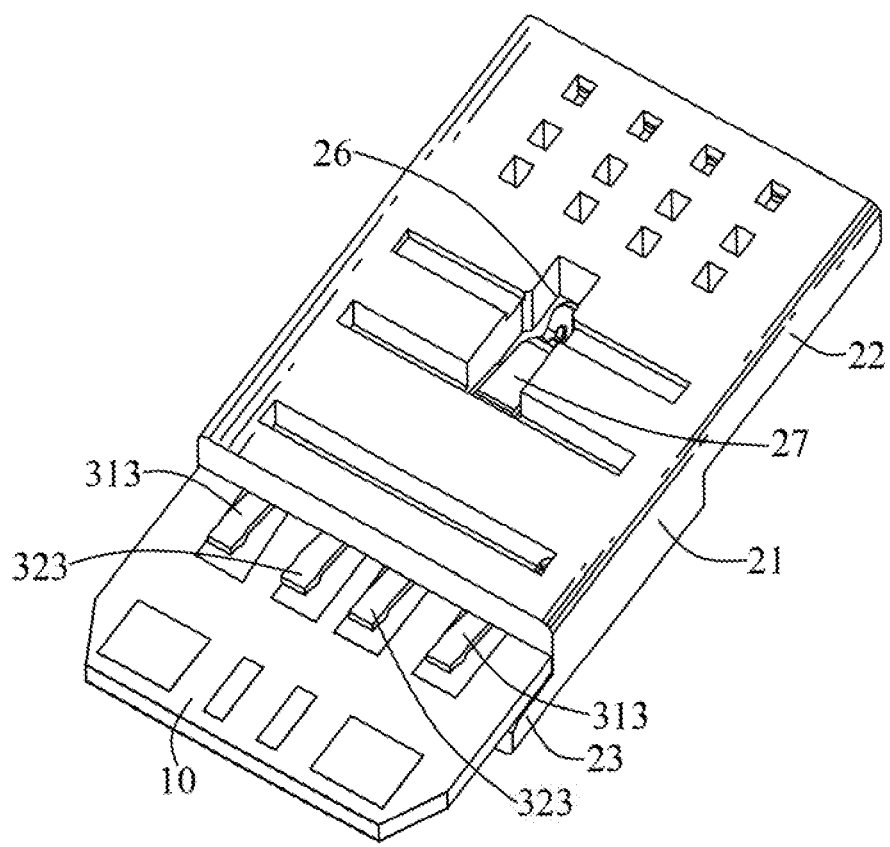
FIG. 7 is another partially perspective view of the plug connector of FIG. 6, wherein the shielding shell and the insulating housing are omitted.

Referring to FIG. 2, FIG. 3 and FIG. 7, the dielectric body 20 has a docking surface 24. Specifically, the dielectric body 20 has a base portion 21. The base portion 21 has a front surface 211, a rear surface 212 opposite to the front surface 211, a bottom surface 213 connected between bottoms of the front surface 211 and the rear surface 212, and a top surface 214 opposite to the bottom surface 213 and connected between tops of the front surface 211 and the rear surface 212. A lower portion of the front surface 211 of the base portion 21 protrudes in a frontward direction to form a tongue board 22. The tongue board 22 has a top face 221 connected with the lower portion of the front surface 211 of the base portion 21 and located in front of the top surface 214 of the base portion 21, a bottom face 223 opposite to the top face 221 and connected with the bottom surface 213 of the base portion 21, and a front face 222 connected between fronts of the top face 221 and the bottom face 223 and opposite to the rear surface 212 of the base portion 21.

The top face 221 of the tongue board 22 is defined as the docking surface 24. A front of the top face 221 of the tongue board 22 is recessed in a downward direction to form a locking groove 25 passing through the front face 222 of the tongue board 22. A rear end of the tongue board 22 opens a receiving hole 26 penetrating through the rear end of the tongue board 22 along a vertical direction. The receiving hole 26 is located behind the lacking groove 25. The base portion 21 opens an opening 27 penetrating through middles of a bottom of the front surface 211 and a front of the bottom surface 213 of the base portion 21. The opening 27 is communicated with the receiving hole 26. Upper portions of two opposite sides of the rear surface 212 of the base portion 21 protrude in a rearward direction to form two clamping portions 23. The rearward direction is opposite to the frontward direction. The downward direction is perpendicular to the frontward direction and the rearward direction. The vertical direction is an up-down direction perpendicular to the frontward direction and the rearward direction.

Figure 4:
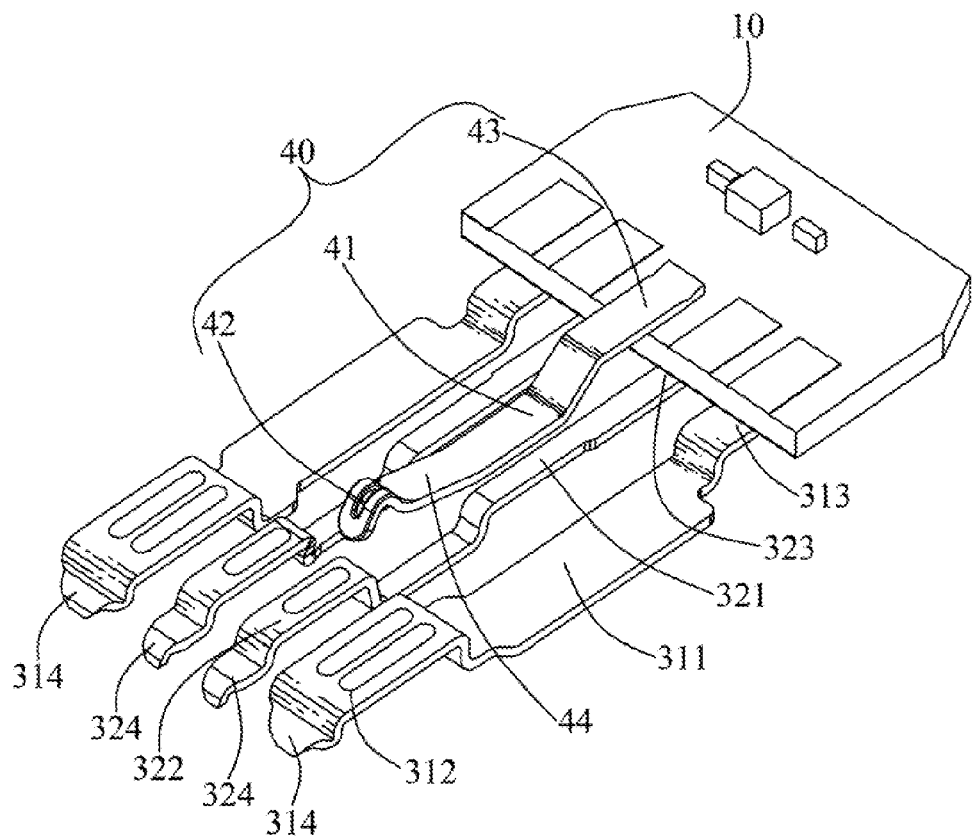
FIG. 4 is a partially perspective view of the plug connector of FIG. 1, wherein a dielectric body, a shielding shell and an insulating housing are omitted.
Figure 5:
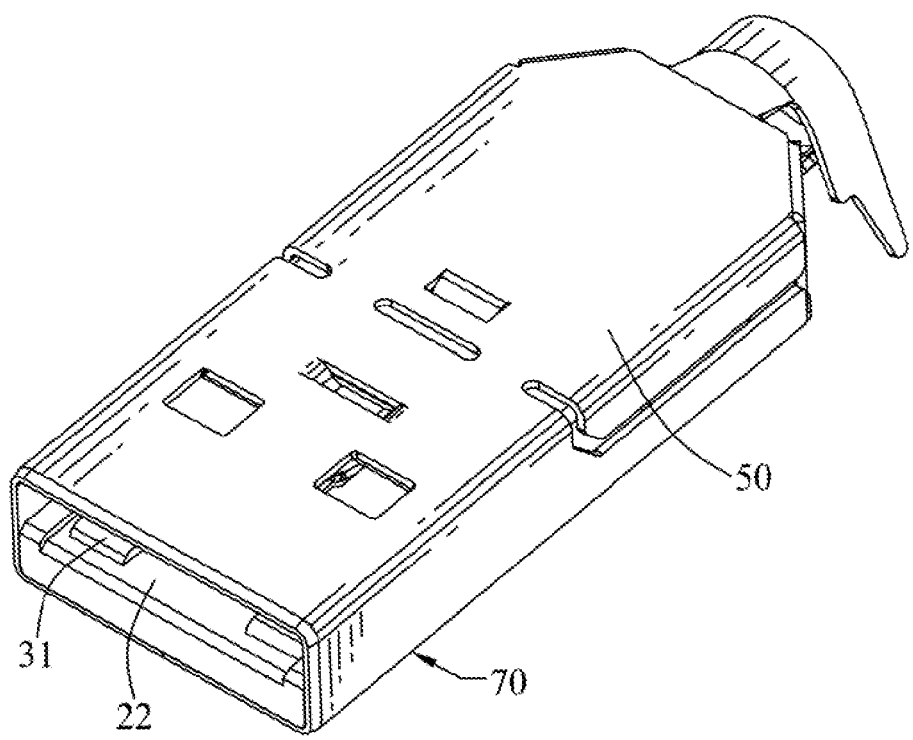
FIG. 5 is a partially perspective view of the plug connector of FIG. 1, wherein the insulating housing is omitted.
Figure 6:
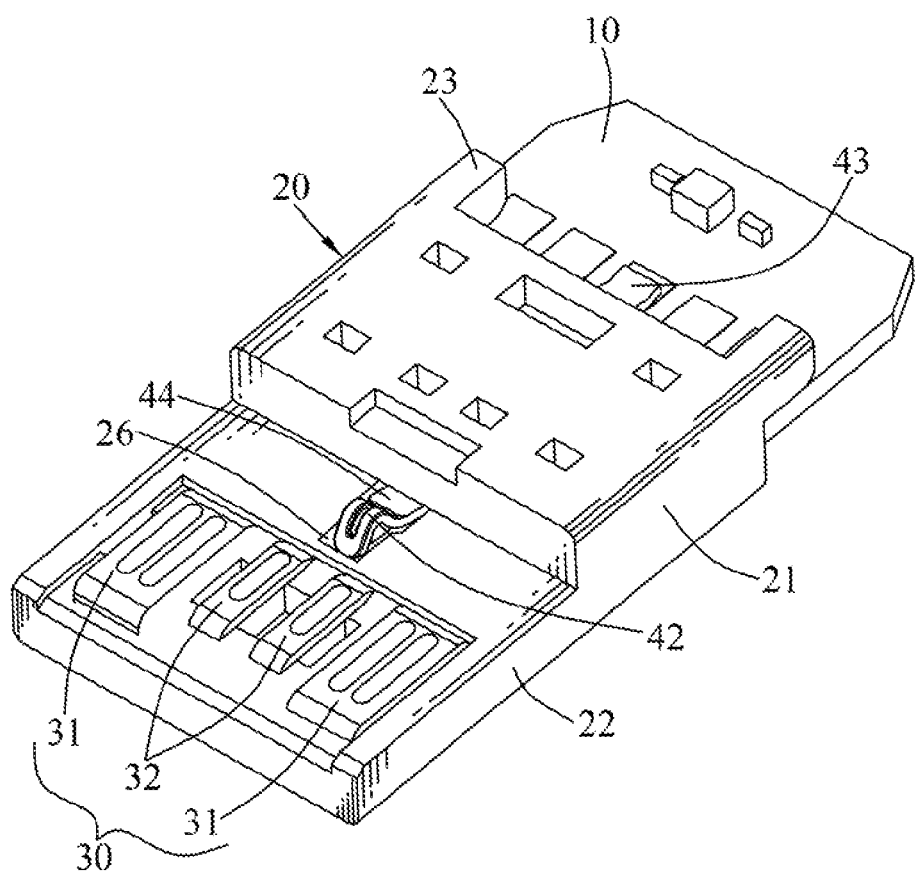
FIG. 6 is a partially perspective view of the plug connector of FIG. 1, wherein the shielding shell and the insulating housing are omitted.

Referring to FIG. 2 to FIG. 4, the plurality of the first terminals 30 include two power terminals 31 and two signal terminals 32. Each of the two power terminals 31 has a rectangular plate-shaped first fastening portion 311, a first soldering portion 313 connected with a rear end of the first fastening portion 311, and a first contact portion 312 connected with a front end of the first fastening portion 311 opposite to the rear end of the first fastening portion 311. A free end of the first contact portion 312 is connected with a first fixing portion 314. Specifically, the rear end of the first fastening portion 311 is bent in an upward direction and then extended in the rearward direction to form the first soldering portion 313. The front end of the first fastening portion 311 is bent in the upward direction, then extended in the frontward direction and further bent in the downward direction to form the first contact portion 312. The first contact portion 312 is of a substantially inverted U shape. The free end of the first contact portion 312 is bent in the frontward direction and then bent in the downward direction to form the first fixing portion 314. The upward direction is opposite to the downward direction. A width of the first soldering portion 313 is narrower than widths of the first fastening portion 311 and the first contact portion 312.

Each of the two signal terminals 32 has a strip-shaped second fastening portion 321, a second soldering portion 323 connected with a rear end of the second fastening portion 321, and a second contact portion 322 connected with a front end of the second fastening portion 321 opposite to the rear end of the second fastening portion 321. A free end of the second contact portion 322 is connected with a second fixing portion 324. Specifically, the rear end of the second fastening portion 321 is bent in the upward direction and then bent in the rearward direction to form the second soldering portion 323. The front end of the second fastening portion 321 is bent in the upward direction, then extended in the frontward direction and further bent in the downward direction to form the second contact portion 322. The second contact portion 322 is of a substantially inverted U shape. The free end of the second contact portion 322 is bent in the frontward direction and then bent in the downward direction to form the second fixing portion 324.

Referring to FIG. 2 to FIG. 4 again, the second terminal 40 is an identification (ID) terminal. The second terminal 40 has a strip-shaped third fastening portion 41, an elastic portion 44 slantwise extended in the frontward direction and in the upward direction from a front end of the third fastening portion 41, a third contact portion 42 arched in the upward direction from a free end of the elastic portion 44, and a third soldering portion 43 slantwise extended in the upward direction and in the rearward direction and then extended in the rearward direction from a rear end of the third fastening portion 41.

The shielding shell 50 is of a substantially rectangular hollow shape. A middle of the shielding shell 50 defines an accommodating chamber 51 penetrating through middles of two opposite ends of the shielding shell 50. The insulating housing 60 is of a rectangular hollow shape. A front surface of the insulating housing 60 is recessed in the rearward direction to form a receiving space 61.

Referring to FIG. 1 to FIG. 7, at first, the plurality of the first terminals 30 and the second terminal 40 are integrally formed by a mold (not shown), and stamped from a metal plate. The plurality of the first terminals 30 and the second terminal 40 are integrally molded to the dielectric body 20. The plurality of the first terminals 30 are fastened to the dielectric body 20 and are arranged transversely. The circuit board 10 is mounted to a rear of the dielectric body 20 and located under the two clamping portions 23. The circuit board 10 is disposed between the rear surface 212 of the base portion 21 and bottom surfaces of the two clamping portions 23. The two signal terminals 32 are located between the two power terminals 31. The second terminal 40 is located between the two signal terminals 32. Top surfaces of front ends of the plurality of the first terminals 30 are exposed to the docking surface 24 of the dielectric body 20. Rear ends of the plurality of the first terminals 30 project beyond a rear surface of the dielectric body 20 and are soldered to the circuit board 10.

Specifically, front ends of the first fastening portions 311 and the first fixing portions 314 of the two power terminals 31 are fastened in the tongue board 22. Rear ends of the first fastening portions 311 and front ends of the first soldering portions 313 of the two power terminals 31 are fastened in the base portion 21. Rear ends of the first soldering portions 313 of the two power terminals 31 project beyond the rear surface 212 of the base portion 21 and are soldered to a bottom surface of the circuit board 10. The two first contact portions 312 of the two power terminals 31 are fastened to the tongue board 22. Top surfaces of the two first contact portions 312 of the two power terminals 31 are exposed to a top surface of a bottom wall of the lacking groove 25. Front ends of the second fastening portions 321 and the second fixing portions 324 of the two signal terminals 32 are fastened in the tongue board 22. Rear ends of the second fastening portions 321 and front ends of the second soldering portions 323 of the two signal terminals 32 are fastened in the base portion 21. Rear ends of the second soldering portions 323 of the two signal terminals 32 project beyond the rear surface 212 of the base portion 21 and are soldered to the bottom surface of the circuit board 10. The two second contact portions 322 of the two signal terminals 32 are fastened to the tongue board 22. Top surfaces of the two second contact portions 322 of the two signal terminals 32 are exposed to the top surface of the bottom wall of the lacking groove 25.

The second terminal 40 is fastened to the dielectric body 20. The second terminal 40 is located behind the front ends of the plurality of the first terminals 30. A front end of the second terminal 40 elastically projects beyond the docking surface 24 of the dielectric body 20, and a rear end of the second terminal 40 projects beyond the rear surface of the dielectric body 20 and is soldered to the circuit board 10. Specifically, the second terminal 40 is located behind the two second contact portions 322 of the two signal terminals 32. The rear end of the third fastening portion 41 and a front end of the third soldering portion 43 of the second terminal 40 are fastened in the base portion 21. The front end of the third fastening portion 41 and the elastic portion 44 are received in the opening 27. The third contact portion 42 is elastically received in the receiving hole 26 and projects beyond the docking surface 24 of the tongue board 22 of the dielectric body 20. A rear end of the third soldering portion 43 projects beyond the rear surface 212 of the base portion 21 and is soldered to a top surface of the circuit board 10.

Then, the shielding shell 50 surrounds the dielectric body 20, the plurality of the first terminals 30, the second terminal 40 and the circuit board 10. The dielectric body 20 and the circuit board 10 together with the first terminals 30 and the second terminal 40 are accommodated in the accommodating chamber 51. The shielding shell 50 cooperates with a front of the dielectric body 20, and the front ends of the plurality of the first terminals 30 and the second terminal 40 to form a male plug 70. The shielding shell 50 cooperates with a front of the base portion 21 of the dielectric body 20, the tongue board 22 of the dielectric body 20, and the front ends of the plurality of the first terminals 30 and the second terminal 40 to form the male plug 70. At last, the insulating housing 60 is integrally molded to and fastened to a rear end of the shielding shell 50. The rear end of the shielding shell 50, a rear of the base portion 21, the circuit board 10 and the rear ends of the plurality of the first terminals 30 and the second terminal 40 are received in the receiving space 61.

In use, the plug connector 100 is used in a quick charger (not shown). When the plug connector 100 is connected with a mating connector (not shown), a contact area between each of the two power terminals 31 of the plug connector 100 and the mating connector is increased on account of the widths of the first fastening portion 311 and the first contact portion 312 being wider than the width of the first soldering portion 313, correspondingly, a contact resistance is decreased, the quick charger can realize a quick charging function effectively. The circuit board 10 is equipped with an encryption chip 11. The second terminal 40 is connected with the encryption chip 11. The encryption chip 11 is read by virtue of the second terminal 40 of the plug connector 100, so that the plug connector 100 has the On-The-Go (OTG) function.

As described above, the second terminal 40 is fastened to the dielectric body 20, the front end of the second terminal 40 elastically projects beyond the docking surface 24 of the dielectric body 20, and the rear end of the second terminal 40 projects beyond the rear surface of the dielectric body 20 and is soldered to the circuit board 10, the encryption chip 11 is read by virtue of the second terminal 40 of the plug connector 100 for satisfying a variety of needs of users, so that the plug connector 100 has the On-The-Go (OTG) function. Furthermore, the plurality of the first terminals 30 and the second terminal 40 are integrally formed, the plurality of the first terminals 30 and the second terminal 40 are integrally molded to the dielectric body 20. As a result, the plug connector 100 has simple production processes, a higher assembling efficiency and a lower production cost.

What is claimed is:

1. A plug connector having an On-The-Go function, comprising:
    a dielectric body having a docking surface;
    a circuit board mounted to a rear of the dielectric body;
    a plurality of first terminals fastened to the dielectric body and arranged transversely, top surfaces of front ends of the plurality of the first terminals being exposed to the docking surface of the dielectric body, rear ends of the plurality of the first terminals projecting beyond a rear surface of the dielectric body and being soldered to the circuit board; and
    a second terminal fastened to the dielectric body, the second terminal being located behind the front ends of the plurality of the first terminals, a front end of the second terminal elastically projecting beyond the docking surface of the dielectric body, and a rear end of the second terminal projecting beyond the rear surface of the dielectric body and being soldered to the circuit board, wherein the circuit board is equipped with an encryption chip, the second terminal is connected to the encryption chip and the encryption chip is read by the virtue of the second terminal so that the plug connector has the On-The-Go function.

2. The plug connector as claimed in claim 1, wherein the plurality of the first terminals include two power terminals and two signal terminals, the two signal terminals are located between the two power terminals, the second terminal is located between the two signal terminals, the second terminal is an identification terminal.

3. The plug connector as claimed in claim 2, wherein the dielectric body has a base portion, a lower portion of a front surface of the base portion protrudes in a frontward direction to form a tongue board, each of the two power terminals has a first fastening portion, and a first soldering portion connected with a rear end of the first fastening portion, front ends of the first fastening portions of the two power terminals are fastened in the tongue board, rear ends of the first fastening portions and front ends of the first soldering portions of the two power terminals are fastened in the base portion, rear ends of the first soldering portions of the two power terminals project beyond a rear surface of the base portion and are soldered to a bottom surface of the circuit board.

4. The plug connector as claimed in claim 3, wherein a front of a top face of the tongue board is recessed in a downward direction to form a locking groove passing through a front face of the tongue board, each of the two power terminals has a first contact portion connected with a front end of the first fastening portion opposite to the rear end of the first fastening portion, the two first contact portions of the two power terminals are fastened to the tongue board, top surfaces of the two first contact portions of the two power terminals are exposed to a top surface of a bottom wall of the locking groove.

5. The plug connector as claimed in claim 4, wherein a width of the first soldering portion is narrower than widths of the first fastening portion and the first contact portion.

6. The plug connector as claimed in claim 4, wherein a free end of the first contact portion is connected with a first fixing portion, the first fixing portions of the two power terminals are fastened in the tongue board.

7. The plug connector as claimed in claim 6, wherein the rear end of the first fastening portion is bent in an upward direction and then extended in a rearward direction to form the first soldering portion, the front end of the first fastening portion is bent in the upward direction, then extended in the frontward direction and further bent in the downward direction to form the first contact portion which is of a substantially inverted U shape, the free end of the first contact portion is bent in the frontward direction and then bent in the downward direction to form the first fixing portion, the upward direction is opposite to the downward direction.

8. The plug connector as claimed in claim 4, wherein each of the two signal terminals has a second fastening portion, and a second soldering portion connected with a rear end of the second fastening portion, front ends of the second fastening portions of the two signal terminals are fastened in the tongue board, rear ends of the second fastening portions and front ends of the second soldering portions of the two signal terminals are fastened in the base portion, rear ends of the second soldering portions of the two signal terminals project beyond the rear surface of the base portion and are soldered to the bottom surface of the circuit board.

9. The plug connector as claimed in claim 8, wherein each of the two signal terminals has a second contact portion connected with a front end of the second fastening portion opposite to the rear end of the second fastening portion, the two second contact portions of the two signal terminals are fastened to the tongue board, top surfaces of the two second contact portions of the two signal terminals are exposed to the top surface of the bottom wall of the locking groove.

10. The plug connector as claimed in claim 9, wherein a free end of the second contact portion is connected with a second fixing portion, the second fixing portions of the two signal terminals are fastened in the tongue board.

11. The plug connector as claimed in claim 10, wherein the rear end of the second fastening portion is bent in an upward direction and then bent in a rearward direction to form the second soldering portion, the front end of the second fastening portion is bent in the upward direction, then extended in the frontward direction and further bent in the downward direction to form the second contact portion which is of a substantially inverted U shape, the free end of the second contact portion is bent in the frontward direction and then bent in the downward direction to form the second fixing portion.

12. The plug connector as claimed in claim 9, wherein the second terminal is located behind the two second contact portions of the two signal terminals.

13. The plug connector as claimed in claim 1, wherein the dielectric body has a base portion which has a front surface, a rear surface opposite to the front surface, a bottom surface connected between bottoms of the front surface and the rear surface, and a top surface opposite to the bottom surface and connected between tops of the front surface and the rear surface, a lower portion of the front surface of the base portion protrudes in a frontward direction to form a tongue board, the tongue board has a top face connected with the lower portion of the front surface of the base portion and located in front of the top surface of the base portion, the top face of the tongue board is defined as the docking surface.

14. The plug connector as claimed in claim 13, wherein the base portion opens an opening penetrating through middles of a bottom of the front surface and a front of the bottom surface of the base portion, the second terminal has a third fastening portion, and an elastic portion slantwise extended in the frontward direction and in an upward direction from a front end of the third fastening portion, the front end of the third fastening portion and the elastic portion are received in the opening.

15. The plug connector as claimed in claim 14, wherein a rear end of the tongue board opens a receiving hole penetrating through the rear end of the tongue board along a vertical direction, the opening is communicated with the receiving hole, the vertical direction is an up-down direction perpendicular to the frontward direction, the second terminal has a third contact portion arched in the upward direction from a free end of the elastic portion, the third contact portion is elastically received in the receiving hole and projects beyond the docking surface of the tongue board of the dielectric body.

16. The plug connector as claimed in claim 14, wherein the second terminal has a third soldering portion slantwise extended in the upward direction and in a rearward direction and then extended in the rearward direction from a rear end of the third fastening portion, the rear end of the third fastening portion and a front end of the third soldering portion of the second terminal are fastened in the base portion, a rear end of the third soldering portion projects beyond the rear surface of the base portion and is soldered to a top surface of the circuit board.

17. The plug connector as claimed in claim 1, wherein the plurality of the first terminals and the second terminal are integrally formed.

18. The plug connector as claimed in claim 1, further comprising a shielding shell surrounding the dielectric body, the plurality of the first terminals, the second terminal and the circuit board, the shielding shell cooperating with a front of the dielectric body, and the front ends of the plurality of the first terminals and the second terminal to form a male plug.

19. The plug connector as claimed in claim 18, further comprising an insulating housing integrally molded to and fastened to a rear end of the shielding shell.

* * * * *